US009144079B1

(12) United States Patent
Marupaduga et al.

(10) Patent No.: US 9,144,079 B1
(45) Date of Patent: Sep. 22, 2015

(54) DYNAMIC ADJUSTMENT OF THE NUMBER OF UPLINK GRANTS PER RANDOM ACCESS RESPONSE MESSAGE

(71) Applicant: Sprint Communications Company L.P., Overland Park, KS (US)

(72) Inventors: Sreekar Marupaduga, Overland Park, KS (US); Nicholas David Kullman, Kansas City, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 165 days.

(21) Appl. No.: 13/958,994

(22) Filed: Aug. 5, 2013

(51) Int. Cl.
*H04W 72/06* (2009.01)
*H04W 72/08* (2009.01)
*H04W 72/14* (2009.01)

(52) U.S. Cl.
CPC ............ *H04W 72/085* (2013.01); *H04W 72/14* (2013.01)

(58) Field of Classification Search
CPC .................................................. H04W 72/085
See application file for complete search history.

(56) References Cited

U.S. PATENT DOCUMENTS

| 2009/0109915 | A1* | 4/2009 | Pasad et al. | 370/329 |
| 2010/0279628 | A1* | 11/2010 | Love et al. | 455/70 |
| 2010/0296467 | A1 | 11/2010 | Pelletier et al. | |
| 2010/0329131 | A1* | 12/2010 | Oyman et al. | 370/252 |
| 2013/0064172 | A1* | 3/2013 | Park et al. | 370/315 |
| 2014/0153517 | A1* | 6/2014 | Chen et al. | 370/329 |

* cited by examiner

*Primary Examiner* — Jason Mattis

(57) ABSTRACT

Embodiments disclosed herein provide systems and methods for to dynamically adjusting the number of uplink grants per random access response (RAR) message. In a particular embodiment, a method provides, for a Long Term Evolution (LTE) wireless access node having a downlink control channel including a plurality of control channel elements, determining wireless signal conditions for a plurality of wireless devices requesting communication service from the wireless access node. The method further provides allocating a number of the plurality of control channel elements for a random access response message based on the wireless signal conditions. The method further includes transferring a plurality of uplink grants to the plurality of wireless devices in the number of control channel elements.

20 Claims, 7 Drawing Sheets

US 9,144,079 B1

DYNAMIC ADJUSTMENT OF THE NUMBER OF UPLINK GRANTS PER RANDOM ACCESS RESPONSE MESSAGE

TECHNICAL BACKGROUND

Communications transferred from an access node of a Long Term Evolution (LTE) wireless communication network are divided into frames, which are in turn divided into subframes. Control channels of the LTE access node are transferred at the beginning of each subframe. Specifically, the beginning of each subframe is divided into a plurality of control channel elements with each control channel using a portion of those elements.

One of the control channels discussed above is a Physical Downlink Control Channel (PDCCH). The PDCCH, in part, is configured to transfer uplink grants to wireless devices to allow traffic channel access to the LTE network. A wireless device will request a traffic channel for the access node and then monitor information on the PDCCH for an uplink grant that informs the wireless device of uplink resources allocated to the wireless device in response to the request. The wireless device then uses the uplink resources identified in that uplink grant to transfer communications to the access node. The message on the PDCCH that includes the uplink grants is referred to as a random access response (RAR) message. The RAR message itself uses a certain number of the CCEs allocated to the PDCCH in order to transfer the uplink grants. The number of CCEs used for the RAR is constant and does not change.

OVERVIEW

Embodiments disclosed herein provide systems and methods for to dynamically adjusting the number of uplink grants per random access response (RAR) message. In a particular embodiment, a method provides, for a Long Term Evolution (LTE) wireless access node having a downlink control channel including a plurality of control channel elements, determining wireless signal conditions for a plurality of wireless devices requesting communication service from the wireless access node. The method further provides allocating a number of the plurality of control channel elements for a random access response message based on the wireless signal conditions. The method further includes transferring a plurality of uplink grants to the plurality of wireless devices in the number of control channel elements.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
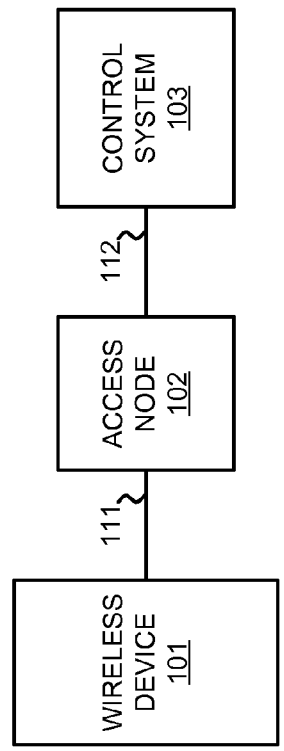
FIG. 1 illustrates a wireless communication system for dynamically adjusting the number of uplink grants per random access response (RAR) message.

FIG. 1 illustrates wireless communication system 100. Wireless communication system 100 includes wireless communication device 101, Long Term Evolution (LTE) wireless access node 102, and communication control system 103. Wireless communication device 101 and wireless access node 102 communicate over wireless link 111. Wireless access node 102 and communication control system 103 communicate over communication link 112.

In operation, access node 102 provides LTE communication services to wireless communication devices, such as wireless device 101. The LTE protocol includes physical control channels for access node 102. The physical control channels occupy the first symbols of an LTE subframe and each comprise a number of control channel elements (CCEs). One of the control channels (e.g. a Physical Downlink Control Channel (PDCCH)) transfers random access response (RAR) messages. A RAR message includes uplink grants to wireless devices that requested traffic channel access from access node 102. An uplink grant provides resource information (e.g. sub-carrier frequency, etc.) that a wireless device will use to transfer uplink communications to access node 102. Typically, an RAR message is transferred using a set number of CCEs and, therefore, the number of uplink grants that access node 102 transfers in each subframe is limited to the number of uplink grants that fit in the set number of CCEs.

Figure 2:
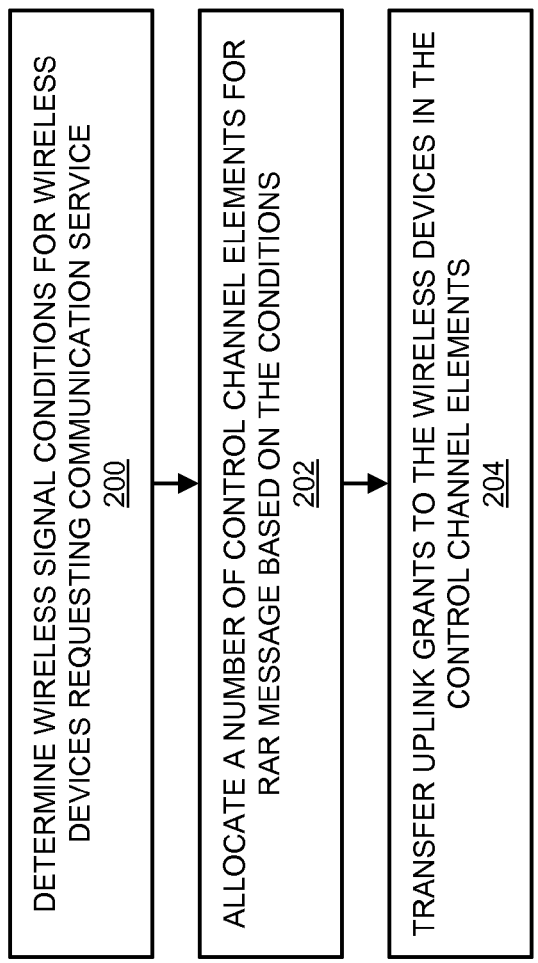
FIG. 2 illustrates an operation of the wireless communication system for dynamically adjusting the number of uplink grants per RAR message.

FIG. 2 illustrates an operation of wireless communication system 100 to dynamically adjust the number of uplink grants per RAR message. For LTE wireless access node 102 having a downlink control channel including a plurality of CCEs, control system 103 determines wireless signal conditions for a plurality of wireless devices requesting communication service from wireless access node 102 (step 200). The wireless signal conditions may be determined based on the signal quality of each wireless signal received at access node 102 from the respective wireless devices. For example, control system 103 may determine the received power level, signal to noise ratio, or other signal quality indicator—including combinations and metrics thereof, of a wireless signal from wireless device 101 that requested a traffic channel over a random access channel of access node 102. The signal conditions from wireless device 101 are then combined with conditions determined for signals from other wireless devices to determine the signal conditions for the wireless devices. In some embodiments, the combination is the result of an averaging of the signal conditions from each device, although, other methods may also be used.

Control system 103 then allocates a number of the plurality of CCEs for a RAR message based on the wireless signal conditions (step 202). The number of CCEs allocated to the RAR message is increased for better wireless signal conditions of requesting devices. In contrast, the number of CCEs allocated to the RAR message is decreased for worse wireless signal conditions. In some embodiments, control system 103 uses threshold values of signal quality (i.e. power level, signal to noise ratio, quality metric, etc.) to determine a number of CCEs to allocate. For example, a given number of CCEs may be allocated for signal qualities within a range bounded by the threshold values. Ranges having higher signal quality relative to other ranges are associated with larger numbers of CCEs. Some embodiments may provide a minimum number of CCEs that can be allocated and may also provide a maximum number of CCEs that can be allocated. Further embodiments, may also consider the number of CCEs available for the RAR message when determining how many CCEs to allocate. For example, control system 103 may determine whether surplus CCEs are available that are not being used for other purposes. The number of those surplus CCEs will limit the number of CCEs that can be allocated to the RAR message.

When allocating the CCEs to the RAR message, control system 103 indicates the number of CCEs to access node 102. Access node 102 then configures the control channels on wireless link 111 accordingly. Wireless devices may be notified of the CCE allocation for RAR messages based on information indicated in another control channel. That is, data transferred in another control channel may indicate the configuration of the RAR to wireless devices.

Once the number of CCEs have been allocated to the RAR message, access node 102 transfers a plurality of uplink grants to the plurality of wireless devices in the allocated CCEs (step 204). The number of uplink grants that comprise the plurality of uplink grants corresponds to the number of uplink grants that can fit within the data capacity of the number of allocated CCEs. Therefore, more uplink grants may be transferred to wireless devices if more CCEs are allocated for such purposes.

In an example, wireless device 101 will monitor the CCEs that comprise the RAR message to determine whether access node 102 has allocated uplink resources in response to a traffic channel request. Upon identifying an uplink grant intended for wireless device 101, wireless device 101 interprets the uplink information contained therein to transfer uplink communications to access node 102.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

LTE wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, eNodeB, Internet access node, telephony service node, wireless data access point, or some other wireless communication system—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless access node 102, but system 103 could be integrated within the components of wireless access node 102. Communication control system 103 could be a mobile switching center, network gateway system, Internet access node, application server, service node, or some other communication system—including combinations thereof.

Wireless link 111 uses the air or space as the transport media. Wireless link 111 uses an LTE protocol. However, wireless access node 102 may also use various other protocols, such as Code Division Multiple Access (CDMA), Evolution Data Only (EVDO), Worldwide Interoperability for Microwave Access (WIMAX), Global System for Mobile Communication (GSM), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
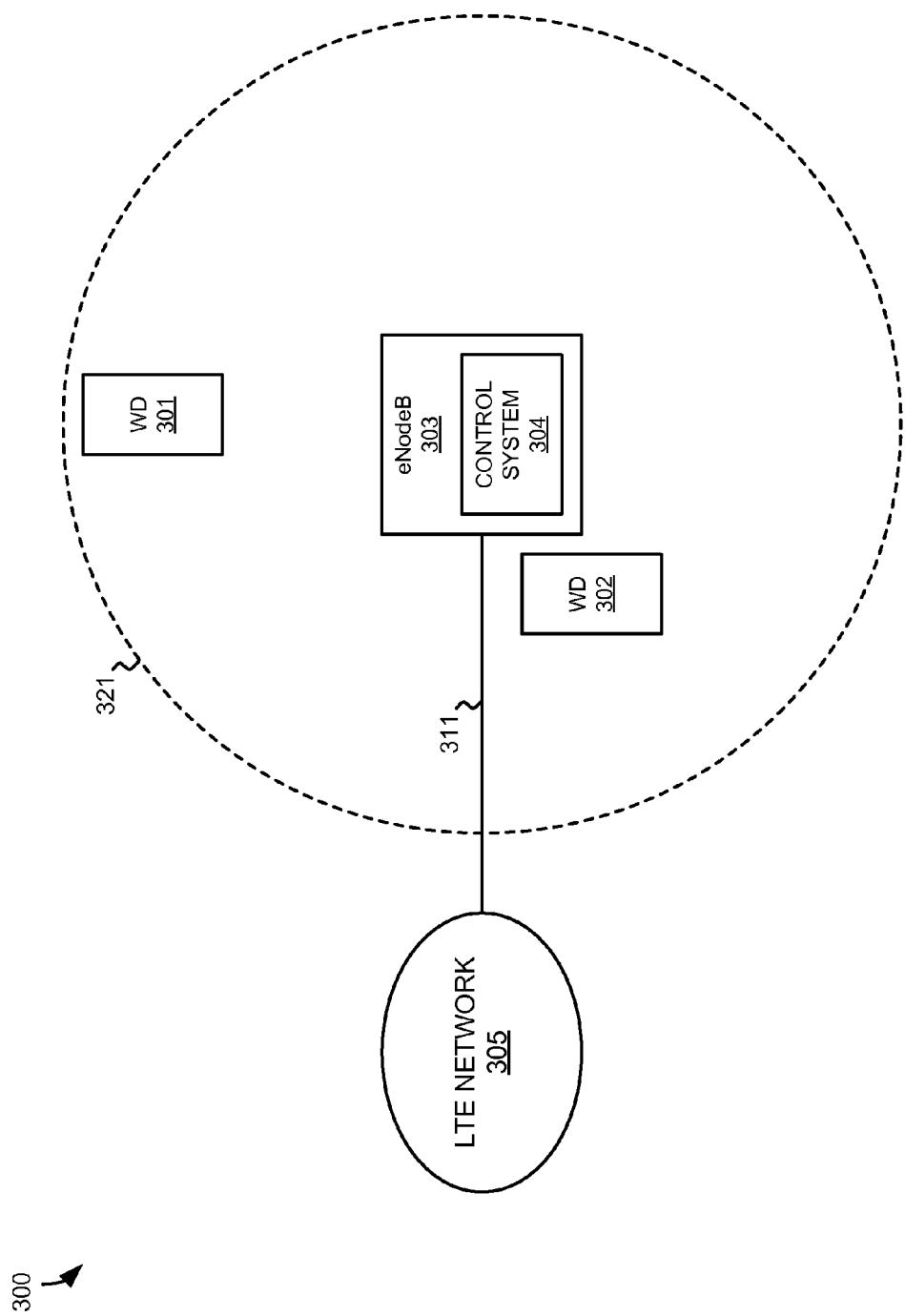
FIG. 3 illustrates a wireless communication system for dynamically adjusting the number of uplink grants per RAR message.

FIG. 3 illustrates wireless communication system 300. Wireless communication system 300 includes wireless communication device 301, wireless communication device 302, eNodeB 303, communication control system 304, LTE communication network 305. eNodeB 303 and LTE communication network 305 communicate over communication link 311. Wireless communication devices 301 and 302 communicate with eNodeB 303 over wireless links in wireless coverage area 321.

Figure 4:
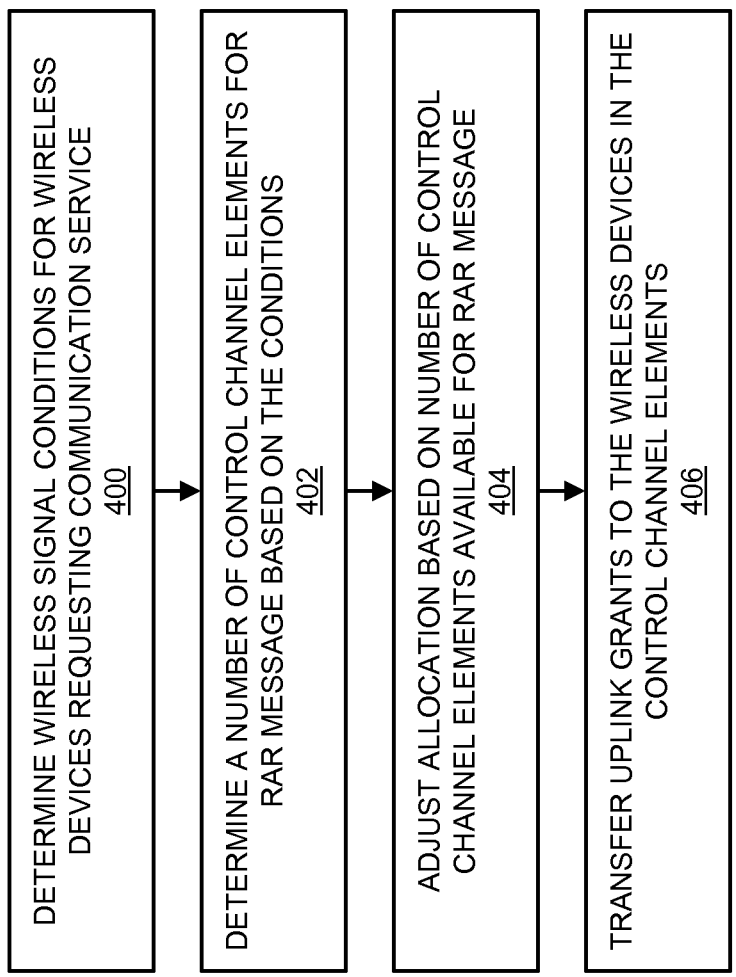
FIG. 4 illustrates an operation of the wireless communication system for dynamically adjusting the number of uplink grants per RAR message.

FIG. 4 illustrates an operation of wireless communication system 300 to dynamically adjust the number of uplink grants per RAR message. In this embodiment, control system 304 is integrated into eNodeB 303, although, in other embodiments control system 304 may be located elsewhere in LTE network 305 and perform similar functionality for other eNodeBs in addition to eNodeB 303. Upon eNodeB 303 receiving a traffic channel request on an LTE random access channel from each of a number of wireless devices, including devices 301 and 302, control system 304 determines wireless signal conditions for the devices requesting traffic channel access based on the condition of the wireless signals received from each of the devices requesting access (step 400).

Typically, due to wireless signal propagation characteristics, wireless signals from wireless devices located further from eNodeB 303 within coverage area 321 will be of lower quality than those from wireless devices closer to eNodeB 303. Therefore, the wireless signal received from wireless device 301 to request a traffic channel will likely be of lower quality than the wireless signal received from wireless device 302 to request a traffic channel because wireless device 302 is located closer to eNodeB 303 than is wireless device 301. Control system 304 aggregates the signal conditions from each wireless device and determines the overall signal conditions for the requesting wireless devices. For example, control system 304 may use an average power level of the wireless signals received from the wireless devices to determine the signal conditions for the devices as a whole.

After determining the wireless signal conditions, control system 304 determines a number of control channel elements (CCEs) that should be allocated for use as an RAR message to the wireless devices on the LTE Physical downlink Control Channel (PDCCH) for eNodeB 303 (step 402). The more CCEs allocated to an RAR message, the more uplink grants can be sent to wireless devices in the RAR message.

Figure 5:
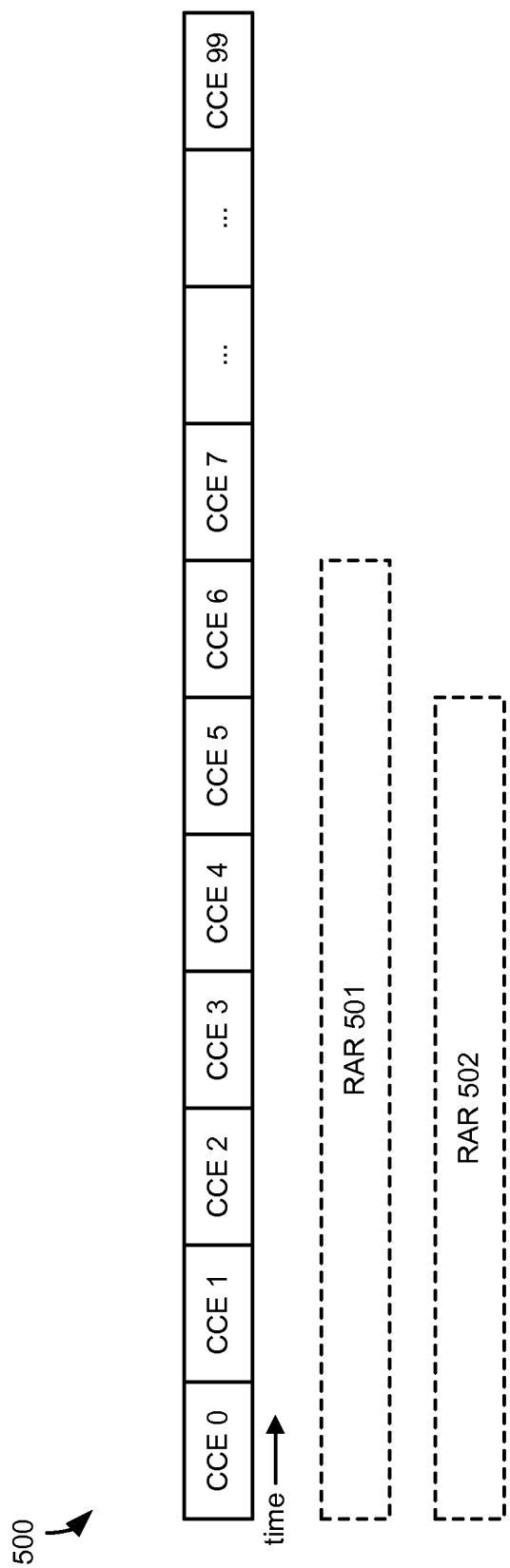
FIG. 5 illustrates an LTE Physical Downlink Control Channel (PDCCH) having communication control elements that may be used for transferring uplink grants.

FIG. 5 illustrates an example of CCEs for PDCCH 500 of eNodeB 303. In this embodiment, PDCCH 500 comprises 100 CCEs numbered 0-99. Within a given LTE subframe, PDCCH 500 is transferred with CCE 0 followed in sequence by CCEs 1-99. Only a portion of the 100 CCEs (e.g. 16 of the CCEs) are in a common search space that can be read by all wireless devices while the other CCEs are used for device specific communications. Control system 304 therefore determines a number of CCEs to be used of the CCEs in the common search space.

Figure 6:
FIG. 6 illustrates a data structure used for dynamically adjusting the number of uplink grants per RAR message.

FIG. 6 illustrates an exemplary data structure 600 that control system 304 may follow to determine the number of CCEs to be used for RAR messaging. Data structure 600 presents signal condition value ranges and the number of CCEs that should be used with each of the values. In this example, the wireless signal conditions, regardless of how they have been determined (i.e. signal strength, signal to noise ratio, etc.), have been normalized for clarity to be unit less values from 1 to 10 with 10 representing the best signal conditions and 1 being the worst. For the purposes of this example, control system 304 determines that the signal conditions for the wireless devices are a 4. Therefore, control system 304 determines that the number of CCEs that should be used for the RAR message is 6 and, as illustrated in FIG. 5, allocates 6 of the CCEs in the common search space of PDCCH 500 to RAR message 501.

Referring back to FIG. 4, control system 304 further allocates CCEs based on the number of CCEs that are available on the PDCCH for the RAR message (step 404). In some situations, the PDCCH may not have enough CCEs available in the common search space for use as the RAR message. This may be caused by the CCEs being used to transmit other information or may be due to a lack of bandwidth on the PDCCH. In this embodiment, control system 304 determines that only 5 CCEs are available for the RAR message. Therefore, instead of allocating 8 CCEs, control system 304 only allocates the limit of 5 CCEs as illustrated by RAR message 502 in FIG. 5.

Once control system 304 has determined a final CCE allocation for eNodeB 303, control system 304 notifies eNodeB 303 of the allocation and eNodeB 303 transfers uplink grants in an RAR message to the wireless devices that requested a traffic channel (step 406). In this embodiment, the uplink grants are transferred in a Downlink scheduling Control Information (DCI) format 0 but other formats may also be used. The number of uplink grants transferred in the RAR message is limited by the amount of information that can be transferred within the allocated number of CCEs.

Upon receiving the RAR message in the PDCCH, wireless devices that requested traffic channels interpret the uplink grants to determine whether uplink resources have been allocated for each device's uplink communications. Thus, two of the uplink grants may be intended for wireless devices 301 and 302, respectively. Wireless devices 301 and 302 use the resources indicated in their respective uplink grants to transfer uplink communications to eNodeB 303.

Figure 7:
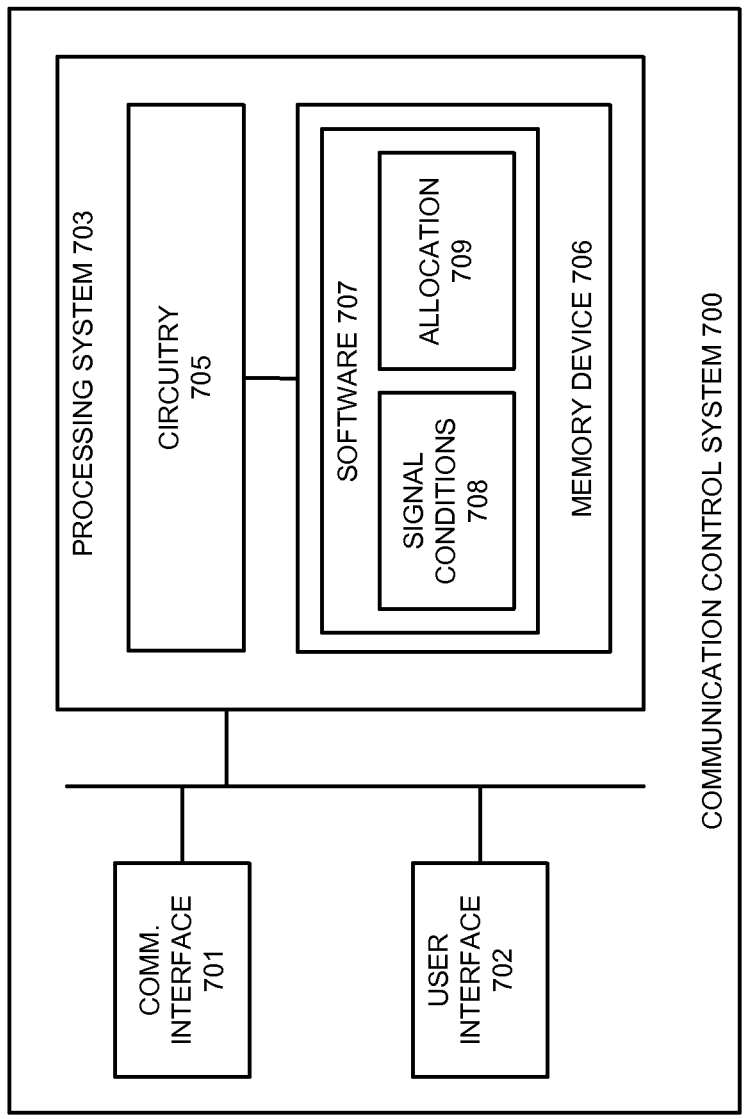
FIG. 7 illustrates a communication control system for dynamically adjusting the number of uplink grants per RAR message.

FIG. 7 illustrates communication control system 700. Communication control system 700 is an example of communication control system 103, although control system 103 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes signal conditions module 708 and CCE allocation module 709. Operating software 707 may further include an operating system, utilities, drivers, network interfaces, applications, or some other type of software. When executed by circuitry 705, operating software 707 directs processing system 703 to operate communication control system 700 as described herein.

In particular, signal conditions module 708 directs processing system 703 to, for a Long Term Evolution (LTE) wireless access node having a downlink control channel including a plurality of control channel elements, determine wireless signal conditions for a plurality of wireless devices requesting communication service from the wireless access node. CCE allocation module 709 directs processing system 703 to allocate a number of the plurality of control channel elements for a random access response message based on the wireless signal conditions. The wireless access node transfers a plurality of uplink grants to the plurality of wireless devices in the number of control channel elements.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:

for a Long Term Evolution (LTE) wireless access node having a downlink control channel including a plurality of control channel elements, determining wireless signal conditions for a plurality of wireless devices requesting communication service from the wireless access node, wherein the wireless signal conditions include an average of signal strengths of respective wireless signals received by the wireless access node from the plurality of wireless devices;

allocating a number of the plurality of control channel elements for a random access response message based on the wireless signal conditions; and transferring a plurality of uplink grants to the plurality of wireless devices in the number of control channel elements.

2. The method of claim 1, further comprising:

determining an amount of the plurality of control channel elements that are available for use as the response message;

allocating the number of the plurality of control channel elements further based on the amount of the plurality of control channel elements.

3. The method of claim 1, wherein allocating the number of the plurality of control channel elements for a response message based on the wireless signal conditions comprises:

determining whether the wireless signal conditions are above a threshold signal conditions value; and if the signal conditions are above the threshold signal conditions value, increasing the number of the plurality of control channel elements.

4. The method of claim 1, wherein allocating the number of the plurality of control channel elements for a response message based on the wireless signal conditions comprises:

determining whether the wireless signal conditions are below a threshold signal conditions value; and if the signal conditions are below the threshold signal conditions value, decreasing the number of the plurality of control channel elements.

5. The method of claim 1 wherein the wireless signal conditions further include signal to noise ratios of respective wireless signals received by the wireless access node from the plurality of wireless communication devices.

6. The method of claim 5, wherein the wireless signal conditions further comprise an average of the signal to noise ratios of the respective wireless signals.

7. The method of claim 1, wherein the plurality of communication devices transfer uplink communications based on uplink resources included in the plurality of uplink grants.

8. The method of claim 1, wherein the wireless access node comprises an eNodeB of a LTE communication network.

9. The method of claim 8, wherein the downlink control channel comprises an LTE Physical Downlink Control Channel (PDCCH).

10. The method of claim 8, wherein the uplink grants are transferred in Downlink scheduling Control Information (DCI) format 0.

11. A wireless communication system, comprising:

a Long Term Evolution (LTE) wireless access node having a downlink control channel including a plurality of control channel elements;

a control system for the wireless access node configured to determine wireless signal conditions for a plurality of wireless devices requesting communication service from the wireless access node and allocate a number of the plurality of control channel elements for a random access response message based on the wireless signal conditions, wherein the wireless signal conditions include an average of signal strengths of respective wireless signals received by the wireless access node from the plurality of wireless devices; and the wireless access node configured to transfer a plurality of uplink grants to the plurality of wireless devices in the number of control channel elements.

12. The wireless communication system of claim 11, further comprising:

the control system configured to determine an amount of the plurality of control channel elements that are available for use as the response message and allocate the number of the plurality of control channel elements further based on the amount of the plurality of control channel elements.

13. The wireless communication system of claim 11, wherein the control system configured to allocate the number of the plurality of control channel elements for a response message based on the wireless signal conditions comprises:

the control system configured to determine whether the wireless signal conditions are above a threshold signal conditions value and, if the signal conditions are above the threshold signal conditions value, increase the number of the plurality of control channel elements.

14. The wireless communication system of claim 11, wherein the control system configured to allocate the number of the plurality of control channel elements for a response message based on the wireless signal conditions comprises:

the control system configured to determine whether the wireless signal conditions are below a threshold signal conditions value and, if the signal conditions are below the threshold signal conditions value, decrease the number of the plurality of control channel elements.

15. The wireless communication system of claim 11, wherein the wireless signal conditions further include signal to noise ratios of respective wireless signals received by the wireless access node from the plurality of wireless communication devices.

16. The wireless communication system of claim 15, wherein the wireless signal conditions further comprise an average of the signal to noise ratios of the respective wireless signals.

17. The wireless communication system of claim 11, wherein the plurality of communication devices transfer uplink communications based on uplink resources included in the plurality of uplink grants.

18. The wireless communication system of claim 11, wherein the wireless access node comprises an eNodeB of a LTE communication network.

19. The wireless communication system of claim 18, wherein the downlink control channel comprises an LTE Physical Downlink Control Channel (PDCCH).

20. The wireless communication system of claim 18, wherein the uplink grants are transferred in Downlink scheduling Control Information (DCI) format 0.

* * * * *